United States Patent [19]
Yamada et al.

[11] Patent Number: 6,013,339
[45] Date of Patent: Jan. 11, 2000

[54] LIQUID CRYSTAL DISPLAY PANEL, SEAL MATERIAL FOR LIQUID CRYSTAL CELL AND LIQUID CRYSTAL DISPLAY

[75] Inventors: Satoshi Yamada; Hideki Matsukawa, both of Osaka, Japan

[73] Assignee: Matsushita Electric Industrial Co., Ltd., Osaka, Japan

[21] Appl. No.: 08/988,317

[22] Filed: Dec. 10, 1997

Related U.S. Application Data

[62] Division of application No. 08/608,109, Feb. 28, 1996, Pat. No. 5,898,041.

[30]    Foreign Application Priority Data

| Mar. 1, 1995 | [JP] | Japan | ................................. 7-041602 |
| Jun. 22, 1995 | [JP] | Japan | ................................. 7-156200 |
| Jun. 30, 1995 | [JP] | Japan | ................................. 7-164858 |

[51] Int. Cl.⁷ ............................ G02F 1/13; G02F 1/1339; C08L 63/10; C08F 2/50
[52] U.S. Cl. ..................... 428/1; 430/20; 349/2; 349/122; 349/153; 349/193; 522/81; 522/83; 522/103
[58] Field of Search ................. 428/1; 522/103, 522/81, 83; 430/20; 349/122, 153, 155, 190, 193–202, 2

[56]    References Cited

U.S. PATENT DOCUMENTS

| 4,297,401 | 10/1981 | Chern et al. . |
| 4,364,168 | 12/1982 | Matsuyama et al. .................. 350/343 |
| 4,695,490 | 9/1987 | McClelland et al. ..................... 428/1 |
| 5,387,445 | 2/1995 | Horiuchi et al. ........................ 428/1 |
| 5,596,023 | 1/1997 | Tsubota et al. . |
| 5,596,024 | 1/1997 | Horie et al. . |

FOREIGN PATENT DOCUMENTS

| 0 385 149 | 9/1990 | European Pat. Off. . |
| 0 646 632 | 4/1995 | European Pat. Off. . |
| 2 634 778 | 2/1990 | France . |
| 58-105124 | 6/1983 | Japan . |
| 59-137929 | 8/1984 | Japan . |
| 59-232315 | 12/1984 | Japan . |
| 61-145586 | 7/1986 | Japan . |
| 62-89025 | 4/1987 | Japan . |
| 1-266510 | 10/1989 | Japan . |
| 3-143911 | 6/1991 | Japan . |
| 3-273215 | 12/1991 | Japan . |
| 3-288129 | 12/1991 | Japan . |
| 4-11223 | 1/1992 | Japan . |
| 4-33910 | 2/1992 | Japan . |
| 4-51023 | 2/1992 | Japan . |
| 4-291237 | 10/1992 | Japan . |
| 5-273560 | 10/1993 | Japan . |
| 6-160872 | 6/1994 | Japan . |
| 7-13173 | 1/1995 | Japan . |
| 7-13174 | 1/1995 | Japan . |
| 2 272 906 | 6/1994 | United Kingdom . |
| 2 279 656 | 1/1995 | United Kingdom . |

*Primary Examiner*—Susan W. Berman
*Attorney, Agent, or Firm*—Merchant & Gould P.C.

[57]    ABSTRACT

This invention relates to a liquid crystal display apparatus formed by sealing a liquid crystal between two substrates having electrodes and an alignment film with a seal material, the production process comprising the steps of attaching two substrates in a vacuum, compressing under atmospheric pressure to provide a uniform cell gap, a temporary hardening process of the seal material by ultraviolet ray irradiation and a main hardening process of the seal material by heating, wherein a radically polymerizable curing resin is used in the liquid crystal seal material. The method provides a liquid crystal display panel having a uniform cell gap, without dislocation of the alighnment between substrates, or discharge of uncured component of a seal material to the liquid crystal, capable of having a seal material firmly attached to the substrates even at panel corner portions, and having an excellent straightness and moisture resistance of the seal material.

2 Claims, 7 Drawing Sheets

LIQUID CRYSTAL DISPLAY PANEL, SEAL MATERIAL FOR LIQUID CRYSTAL CELL AND LIQUID CRYSTAL DISPLAY

This application is a Divisional of application Ser. No. 08/608,109, filed Feb. 28, 1996, now U.S. Pat. No. 5,898,041 which application(s) are incorporated herein by reference.

FIELD OF THE INVENTION

The present invention relates to seal materials for liquid crystal display apparatus that are used as display apparatus for electronic devices, a process for producing the liquid crystal display apparatus using the liquid crystal seal materials, and liquid crystal display apparatus comprising a liquid crystal panel sealed with the liquid crystal seal material in the production process.

BACKGROUND OF THE INVENTION

General production methods for liquid crystal display apparatus having a liquid crystal display panel comprising two transparent substrates, to which electrodes have been applied with an alignment treatment, with liquid crystal sealed therebetween include a method of attaching two substrates to each other via a spacer by the substrates alignment, compressing by a press plate, a weight, or a vacuum packing to provide a uniform cell gap, and curing by heat as disclosed in JP-A-59-232315 or JPB-6-68669.

Among the production methods for a liquid crystal display panel, when a weight or a press plate is used to apply compression to provide a uniform cell gap, there is a problem that the stress on the substrate becomes uneven, generating peel-off of the seal material at a panel corner portion. When a vacuum packing is used to apply compression, there is a problem of dislocation of the aligned substrates caused by the shrinkage of the vacuum packing bag in applying compression.

Examples of liquid crystal seal materials used for attaching the two substrates and sealing a liquid crystal (hereinafter abbreviated as a seal material) include one-pack type thermosetting epoxy resins such as "STRUCTBOND XN-21-F" produced by MITSUI TOATSU Chemical, INC.

Such seal materials containing a thermosetting epoxy resin have problems such as dislocation of the two substrates that are preliminarily aligned and attached, generation of substrate warping due to a high curing temperature (150° C.), and a long curing time.

In order to solve the problems, methods using an ultraviolet ray curing type seal material, a seal material containing both an ultraviolet ray curing type component and a thermosetting type component, and a double type seal material overlapping a thermosetting curing type seal and a ultraviolet ray curing type component can be used.

Examples of ultraviolet ray curing type seal materials include those containing (meth)acrylic acid monomer capable of curing by radical polymerization. A "(Meth)acrylic acid monomer" herein denotes a compound comprising at least one selected from the group consisting of acrylic acid monomer, acrylic acid ester monomer, methacrylic acid monomer, methacrylic acid ester monomer and derivatives thereof.

Since the curing shrinkage by the ultraviolet ray is significant and the curing rate of seals is low in the curing by radical polymerization, there are problems in fixing and of moisture resistance.

In order to prevent such curing shrinkage, use of a modified urethane acrylate is advocated in JP-A-7-13173 and JP-A-7-13174.

However, urethane acrylate expands by heat and is not heat resistant. Particularly in the annealing process conducted to ensure the uniform display plane of the liquid crystal display apparatus, since the annealing needs to be carried out at the nematic-isotropic phase transition temperature (generally from 80° C. to 120° C. or higher), seal materials containing urethane acrylate expand to cause problems such as generation of threshold voltage irregularity caused by the gap height in the vicinity of sealed portions of the liquid crystal panel.

Examples of seal materials containing both an ultraviolet ray curing type component and a thermosetting type component having an improved curing rate include those disclosed in JP-A-4-11223 and JP-A-6-160872. As a commercially available product, "WORLDROCK X-8700" produced by KYORITSU Chemical and Co., LTD. is known.

Since such seals containing both a ultraviolet ray curing type component and a thermosetting type component include a resin obtained by polymerizing (meth)acrylic acid monomer or oligomer as the ultraviolet ray curing component, and an epoxy resin as the thermosetting type component, the epoxy resin disturbs the radical polymerization of (meth)acrylic acid monomer or oligomer in ultravioletray curing to require a great amount of ultraviolet ray energy. Further, since the thermosetting component is an epoxy resin, thermosetting at a high temperature over a long time becomes necessary, which causes problems such as decline of yield in production caused by warpage of glass substrates.

Also a method of adopting a double type seal comprising a thermosetting seal material on the verge of a liquid crystal and applying a ultravioletray curing type seal parallely is advocated in JP-A-3-273215 and JP-A-4-11223.

Further, in a production process of a liquid crystal display panel further comprising a step of dropping and filling liquid crystal between a step of forming a seal material on substrates with electrodes applied with the alignment treatment and a step of attaching opposing substrates via a spacer means, since uncured seal material and liquid crystal contact each other, a seal material polymerized by a radical polymerization and capable of ultraviolet ray curing is required. If a monomer or an oligomer polymerized by a cation polymerization is used, since a cationic compound such as aromatic group diazonium salt of Lewis acid, triallylsulfonium salt, diallyl iodonium salt, triallyl selenium salt, or a metallocene compound is used as an optical initiator, the ion component will leak into the liquid crystal to cause problems such as poor alignment of the liquid crystal and increase of the electric current amount. Therefore, a double seal method applying an ultraviolet ray curing type seal polymerized by radical polymerization on the edge of the liquid crystal, and an epoxy seal parallel thereto is suggested in JP-A-62-89025.

Since the above mentioned double seal method requires a seal twice as wide as a usual one, it causes problems by restricting the product design of the liquid crystal panels, such as a reduced area of a display portion of a liquid display panel, and a smaller electrode terminal portions necessary for installation.

SUMMARY OF THE INVENTION

It is an object of the prevent invention to provide a high-quality and reliable production method for a liquid crystal display panel having a uniform cell gap, without dislocation of the alignment between substrates, or discharge of uncured component of a seal material to the liquid crystal, capable of having a seal material firmly attached to the substrates even at panel corner portions, and having an excellent straightness and moisture resistance of the seal material. Another object of this invention is to provide a liquid crystal seal material, including both an ultraviolet ray curing component and a thermosetting component, used for a liquid crystal panel of a liquid crystal display apparatus having excellent adherence and moisture resistance without disturbing radical polymerization in ultraviolet ray curing, without the need of thermosetting at a high temperature over a long time, without the chance of poor alignment of the liquid crystal, and capable of being used in a dropping production process by containing only (meth)acrylic acid monomer or oligomer polymerized by radical polymerization as the monomer or oligomer component to be polymerized, and a liquid crystal display apparatus with high display quality and reliability comprising a liquid crystal display panel sealed by the liquid crystal seal material.

In order to achieve the above mentioned objects, a production process of liquid crystal display apparatus of the present invention comprises the steps of:

forming a seal portion with a seal material containing a ultraviolet ray curing resin component and a thermosetting resin component at the electrode side edge portion of at least one of two substrates with electrodes to be sealed, attaching the substrates via a spacer means, irradiating ultraviolet rays at least to the seal portion for temporarily hardening the seal portion, and, heating the seal portion for main hardening.

In this method, it is preferable to conduct the attaching process in a reduced pressure atmosphere. Reduced pressure atmosphere herein denotes a pressure of about 0.4 to 1.0 Torr.

In the above mentioned method, it is preferable to carry out alignment treatment on the substrates with electrodes.

In the above mentioned method, it is preferable that the weight ratio of the ultraviolet ray curing resin component and the thermosetting resin component is from 60:40 to 90:10.

A production process for a liquid crystal display panel of the present invention comprises the steps of forming a sealing resin composition containing a curing resin and a curing agent to initiate curing of the curing resin at a portion to be sealed on the surface of a first transparent substrate on which electrodes have been installed, attaching the surface of a second transparent substrate on which electrodes have been installed to the surface of the first transparent substrate with electrodes, placing liquid crystal in a gap between the attached first and second transparent substrates, and, attaching the two transparent substrates with electrodes by means of the above mentioned sealing resin composition, wherein the curing resin of the sealing resin composition is cured to have the curing ratio of 80% or more.

In the above mentioned process, it is preferable that the curing agent in the sealing resin composition comprises an ultraviolet ray curing agent to initiate the curing of the curing resin by the ultraviolet ray irradiation and a thermosetting agent to initiate the curing of the curing resin by heating. wherein the process to cure the curing resin comprises a first process that provides at least 60% and less than 80% of the curing ratio of the curing resin by irradiating an ultraviolet ray to the sealing resin composition, and a second process to increase the curing to at least 80% and less than 100% of the curing ratio of the curing resin by heating the sealing resin composition after the first process.

In the above mentioned process, it is preferable that the curing agent in the sealing resin composition comprises an ultraviolet ray curing agent to initiate the curing of the curing resin by the ultraviolet ray irradiation and a particle type thermosetting agent to initiate the curing of the curing resin by heating, wherein the process to cure the curing resin comprises a first process that provides at least 50% and less than 80% of the curing ratio of the curing resin by irradiating an ultraviolet ray to the sealing resin composition and a second process to increase the curing to at least 80% and less than 100% of the curing ratio of the curing resin by heating the sealing resin composition after the first process.

In the above mentioned process, it is preferable that one pair of large-area transparent substrates with electrodes are used to install a plurality of the liquid crystal display panels so that the pair of large-area transparent substrates with electrodes can be divided into a plurality of the liquid crystal display panels.

In the above mentioned process, it is preferable that the liquid crystal display panel is formed by dropping liquid crystal between the step of forming a seal and the step of attaching the two substrates with electrodes.

A seal material for liquid crystal display panel of the present invention comprises an ultraviolet ray curing component and a thermosetting component. The seal material may contain epoxy (meth)acrylate, (meth)acrylic acid ester, an optical initiator, a thermosetting agent and an inorganic filler as essential components, wherein as the (meth)acrylic acid ester, 5 to 10 weight % based on the seal material of (meth)acrylic acid ester having a plurality of (meth)acrylic acid residues per molecule is included and 2 to 10 weight % based on the seal material of (meth)acrylic acid ester having one (meth)acrylic acid residue per molecule is included.

In the above mentioned seal material, it is preferable that the epoxy (meth)acrylate is present in an amount of 40 to 70 weight % based on the seal material and is bisphenol A type or novolak type.

In the above mentioned seal material, it is preferable that the optical initiator is present in an amount of 3 to 5 weight % based on the seal material and is one selected from the group consisting of an acetophenone type optical initiator, a benzoin type optical initiator and a benzophenone type optical initiator.

In the above mentioned seal material, it is preferable that the thermosetting agent is present in an amount of 2 to 5 weight % based on the seal material and is one selected from the group consisting of hydrazide, aromatic group amine, acid anhydride and imidazole.

In the above mentioned seal material, it is preferable that the thermosetting agent is a particle type thermosetting agent having an average particle size of 3 $\mu$m or smaller.

In the above mentioned seal material, it is preferable that a silane coupling agent is further comprised and present in an amount of 2 to 7 weight % based on the seal material, and is one selected from the group consisting of glycidyl ethoxy silane and glycidyl methoxy silane.

In the above mentioned seal material, it is preferable that the inorganic filler has an average particle size of 1.5 $\mu$m or smaller, and is present in an amount of 8 to 20 weight % based on the seal material and is one selected from the group consisting of hydrated magnesium silicate, calcium carbonate, aluminum carbonate and silica.

A liquid crystal display panel of the present invention comprises two transparent substrates with electrodes attached to each other by sealing with a resin composition mainly comprising a curing resin and with curing ratio of 80% or more.

In the above mentioned panel, it is preferable that the mixing ratio of the ultraviolet ray curing resin component and the thermosetting resin component is 60:40 to 90:10.

In the above mentioned panel, it is preferable that the curing agent for curing the curing resin is a radical polymerization initiator to initiate the radical polymerization of the curing resin.

As mentioned above, the present invention relates to a liquid crystal display panel comprising two substrates with electrodes having a sealed liquid crystal therebetween, of which production process comprises a step of a seal forming process to form a seal portion at the edge portion of at least one of the substrates of the liquid crystal display panel on the electrode side surface by a seal comprising a ultraviolet ray curing agent component and a thermosetting agent component, a first curing step that provides at least 50 to 60% of the curing ratio of the curing resin by irradiating an ultraviolet ray to the sealing resin composition and a second step to increase the curing to at least 80% of the curing ratio of the curing resin by heating the sealing resin composition.

According to the production process of a liquid crystal display panel of the present invention, since the attaching process of two substrates with electrodes is conducted in a vacuum and the compression process to obtain a uniform cell gap is conducted at atmospheric pressure, a uniform cell gap can be obtained without alignment dislocation.

Since a seal material containing both an ultraviolet ray curing component and a thermosetting component and a temporary hardening is conducted by irradiating an ultraviolet ray to the sealing portion of the cell, unlike conventional thermosetting seals, problems such as poor alignment caused by discharge of the seal material due to viscosity decline thereof, cutoff of the seal material and alignment dislocation of the substrates do not occur.

In particular, if the curing ratio of the ultraviolet ray curing component of the seal material after the ultraviolet ray curing is at least 50% to 60%, increase of voltage due to discharge of the seal material into the liquid crystal and a poor alignment of the liquid crystal can be prevented.

Further, if the curing ratio of the seal material after main hardening is at least 80%, peeloff of the panel corner portion at the time of cutting off the substrates can be prevented to produce a reliable liquid crystal display apparatus with a high yield.

A seal material for liquid crystal display panel of the present invention comprising a ultraviolet ray curing component and a thermosetting component contains epoxy (meth)acrylate, (meth)acrylic acid ester, an optical initiator, a thermosetting agent and an inorganic filler as the essential components, wherein as the (meth)acrylic acid ester, 5 to 10 weight % based on the seal material of (meth)acrylic acid ester having a plurality of (meth)acrylic acid residues per molecule is included and 2 to 10 weight % based on the seal material of (meth)acrylic acid ester having one (meth)acrylic acid residue per molecule is included.

In the above mentioned seal material, it is preferable that the epoxy (meth)acrylate is present in an amount of 40 to 70 weight % based on the seal material and is a bisphenol A type or novolak type.

In the above mentioned seal material, it is preferable that the optical initiator is present in an amount of 3 to 5 weight % based on the seal material and is one selected from the group consisting of an acetophenone type optical initiator, a benzoin type optical initiator and a benzophenone type optical initiator.

In the above mentioned seal material, it is preferable that the thermosetting agent is present in an amount of 2 to 5 weight % based on the seal material and is one selected from the group consisting of hydrazide, aromatic group amine, acid anhydride and imidazole.

In the above mentioned seal material, it is preferable that the thermosetting agent is a particle type thermosetting agent having an average particle size of 3 $\mu$m or smaller.

In the above mentioned seal material, it is preferable that the silane coupling agent is present in an amount of 2 to 7 weight % based on the seal material and is one selected from the group consisting of glycidyl ethoxy silane and glycidyl methoxy silane.

In the above mentioned seal material, it is preferable that the inorganic filler having an average particle size of 1.5 $\mu$m or smaller is present in an amount of 8 to 20 weight % based on the seal material and is one selected from the group consisting of hydrated magnesium silicate, calcium carbonate, aluminum carbonate and silica.

The above mentioned seal material can be preferably used as a seal material for a liquid crystal display panel produced by a production process comprising a step of dropping liquid crystal between a step of forming the seal material and a step of attaching the two substrates with electrodes.

A liquid crystal display apparatus of the present invention comprises a liquid crystal display panel containing liquid crystal sealed by any of the above mentioned seal materials.

Further, in the above mentioned liquid crystal display apparatus, it is preferable that the liquid crystal display panel is produced by a production process comprising a step of dropping liquid crystal between a step of forming a seal and a step of attaching the two substrates with electrodes.

According to the above mentioned aspect, the seal material of the present invention, which comprises an ultraviolet ray curing component and a thermosetting component, epoxy (meth)acrylate, (meth)acrylic acid ester, an optical initiator, and a thermosetting agent comprising a thermosetting agent for crosslinking a resin component polymerized by radical polymerization by irradiating an ultraviolet ray to the ultraviolet ray curing component.

As heretofore mentioned, since a seal material of the present invention does not include epoxy resin, heating over a long time is not necessary to cure the epoxy resin, so as not to deteriorate the viscosity of the seal material by heating, the alignment dislocation of the substrates after attaching or the substrate warpage will not occur. Further, since epoxy resin is not included, the risk of disturbing the radical polymerization of epoxy (meth)acrylate or (meth)acrylic acid ester in the ultraviolet ray curing is eliminated.

Accordingly, a liquid crystal display apparatus comprising a liquid crystal panel having liquid crystal sealed with the above mentioned liquid crystal seal material has excellent properties in adhesion and moisture resistance to provide good display quality and reliability without the risk of poor alignment of the liquid crystal or increase of the electric current value.

Further, since the seal material of the present invention cures by radical polymerization and the reaction ratio in ultraviolet ray curing is high, even when a dropping process is employed, namely, a seal material is formed on one of two substrates with electrodes applied with alignment treatment and the substrate is attached to the other substrate via a spacer means before dropping liquid crystal therebetween, the alignment condition or electric characteristic of the liquid crystal will not be affected significantly. In particular, by selecting a thermosetting agent to polymerize at a temperature below the annealing temperature of the liquid crystal panel, even when thermosetting a seal material after ultraviolet ray curing, production efficiency will not decline. Accordingly, a liquid crystal display apparatus with a good display quality can be efficiently provided even with a dropping process.

Further, among the components of the seal material of the present invention, since the epoxy (meth)acrylate component has comparatively small heat expansion and a fast polymerization, when a dropping process, namely a process in which a seal material is provided on a substrate with electrodes applied with the alignment treatment, opposing substrates are attached via a spacer means and liquid crystal is dropped therebetween, is used, it is effective in preventing poor alignment or increase of the electric current value caused by discharge of the seal material component into the liquid crystal by the contact of the uncured liquid seal material and the liquid crystal. Further, since epoxy (meth)acrylate is, in general, available in the form of oligomer, it is used in a form of an oligomer as a component material in this invention.

A (meth)acrylic acid ester containing a plurality of (meth)acrylic acid residues per molecule contributes to increasing the curing density, facilitating thermosetting, and achieving a seal material with reliability in a high temperature. When the component is contained at less than 5 weight % based on the seal material, the crosslinking density becomes insufficient to provide a liquid crystal display apparatus having a high themosetting reliability and moisture resistance. On the other hand, when the amount exceeds 10 weight %, the curing shrinkage becomes significant, preventing the achievement of a good attaching property.

Since (meth)acrylic acid ester having one (meth)acrylic acid residue per molecule has a comparatively small amount of curing shrinkage, it is preferable as a component to curb the curing shrinkage. Further, it provides a solvent of epoxy (meth)acrylate in a stage of a monomer before polymerization and provides a viscosity adjustment agent to enable proper adjustment of the viscosity of the seal material when the seal material is applied to a substrate by printing. When the ratio of the component in the seal material is 2 weight % or less, the curing shrinkage of the seal material becomes too large to achieve a liquid crystal display apparatus having a high adherence. On the other hand, if the ratio exceeds 10 weight %, the crosslinking density becomes too low to achieve a liquid crystal display apparatus having high heat resistance and moisture resistance. Further, by including too much amount, the uncured component becomes liable to be discharged into the liquid crystal to cause problems such as poor alignment and increase of the electric current value.

An optical initiator provides a radical generation source, which is necessary for ultraviolet ray polymerization of the above mentioned (meth)acrylic monomer or oligomer component. A thermosetting agent mainly contributes to the crosslinking by heat and curing by heat of polymer component yielded by the above mentioned ultraviolet ray polymerization to achieve improvement of adherence and heat resistance.

A silane coupling agent is effective in further improving the moisture resistance. An inorganic filler contributes to adherence such as improvement of peeling strength as well as adjustment of viscosity of the seal material.

Since the seal materials of the present invention include the above mentioned components, even though they cure by the radical polymerization, they have excellent adherence and moisture resistance to provide high display quality and reliability.

Preferable embodiments of the present invention will be described hereinafter. It is preferable that epoxy (meth)acrylate is bisphenol A type or novolak type and contained in a liquid crystal seal material by 40 to 70 weight %. A bisphenol A type or novolak type epoxy (meth)acrylate having a viscosity adjustable to have an appropriate viscosity at the time of applying the seal material by printing is preferable. Further, one not liable to expand by heat compared with a modified urethane acrylate is preferable. Since the ratio of 40 to 70 weight % eliminates the problem such as curing shrinkage caused by the increase of the other monomer component ratio, poor alignment of the liquid crystal, increase of the electric current value, high or low viscosity of the seal material when being applied by printing, it is preferable.

Using an optical initiator selected from the group consisting of acetophenone type optical initiator, benzoin type optical initiator and benzophenone type optical initiator, polymerization can proceed well with a wavelength of an ordinary ultraviolet ray lamp. Further, since such optical initiators have a long pot life to eliminate the risk of overpolymerization during adjustment of the seal material or applying the seal material on a substrate by printing, they are prefereble. If the ratio of an optical initiator is too low, since the ultraviolet ray curing cannot proceed well, the uncured component would discharge into the liquid crystal to cause poor alignment of the liquid crystal. On the other hand, if the ratio is too high, since the ultraviolet ray curing cannot proceed sufficiently, problems may occur such as discharge of surplus optical initiator into the liquid crystal to increase the electric current value. Therefore it is preferable that 3 to 5 weight % of an optical initiator is contained in the liquid crystal seal material.

It is preferable to have a thermosetting agent selected from the group consisting of hydrazide, aromatic group amine, acid anhydride and imidazole, since such thermosetting agents have a curing temperature lower than a usual decomposition point to avoid the risk of deteriorating the liquid crystal by heat. Further, since such thermosetting agents have a long pot life, namely, 8 hours or more at a room temperature, they avoid the risk of excessive crosslinking polymerization of the thermosetting agent during the adjustment of the seal material or the application of the seal material onto the substrate by printing.

Since a particle thermosetting agent having an average particle size of 3 μm or less has a long pot life and does not prevent the radical polymerization in the ultraviolet ray curing, it is preferable. Since an average particle size is 3 μm or less, and it is smaller than the gap between two substrates of liquid crystal panel to be adjusted by a spacer means, and thus the risk of causing gap defect is prevented, it is preferable. The lower limit of the average particle size of the thermosetting agent is not particularly limited, but it is, in general, about 1 μm.

Since a silane coupling agent selected from the group consisting of glycidyl ethoxy silane and glycidyl methoxy silane has a further improvement effect of moisture resistance, it is preferable. If the ratio of the silane coupling agent is too low, moisture resistance of the liquid crystal panel cannot be improved. If the ratio of the silane coupling agent is too high, poor alignment of the liquid crystal may occur due to discharge of the seal material into the liquid crystal. Therefore, it is preferable to have a silane coupling agent in the liquid crystal seal material in an amount of 2 to 7 weight % based on the seal material to avoid such problems.

Inorganic fillers selected from the group consisting of hydrated magnesium silicate, calcium carbonate, aluminum oxide and silica are used and those having an average particle size of 1.5 μm or less are comparatively well accessible. They improve adherence and their viscosity can be adjusted easily at the time of printing application of the seal material, and thus they are preferable. By having an inorganic filler having an average particle size of 1.5 μm or smaller, it can disperse well in the seal material, and the average particle size is smaller than the gap of the two substrates of the liquid crystal panels to be adjusted by a spacer means, gap defect cannot occur, and thus it is preferable. The lower limit of the average particle size of the inorganic filler is not particularly limited, but in general, a small one of about 15 nm can be preferably used. If the ratio of an inorganic filler is too low, adhesion cannot be sufficiently improved. If the ratio is too high, it hampers applying the seal material to the substrate by printing, and further a predetermined distance of the gap between the two substrates cannot be maintained. Therefore it is preferable to have an inorganic filler in the seal material in an amount of 8 to 20 weight % to avoid the problems.

By adjusting the ratio of (meth)acrylic acid ester having at least one (meth)acrylic acid residue per molecule and an inorganic filler in the above mentioned margin of blending quantity, a seal material having a viscosity suitable for printing and alignment adjustment after attaching the substrates to enable the efficient production of liquid crystal display apparatus is provided.

By having an average particle size of 1.5 μm, since it improves the thixotropic property of the seal material, liquid crystal display apparatus having a good display quality can be obtained without problems such as deteriorating the alignment of the liquid crystal caused by discharge of the seal material or cutting off of the seal material after attaching the substrates in the dropping method.

DETAILED DESCRIPTION OF THE INVENTION

EXAMPLE 1

Example 1 of the production process of liquid crystal display panels of the present invention includes as the essential elements a process to form a seal portion, a process to attach substrates with a temporary hardening process and a main hardening process of the liquid crystal seal material. By conducting the process to attach two substrates via a spacer means in a vacuum and using atmospheric pressure as the compressing means to provide a uniform gap, substrates are uniformly compressed to provide a cell having a uniform gap. Problems such as peeloff of the seal material after temporary hardening by ultraviolet ray irradiation can be solved.

When atmospheric pressure is used as in the vacuum packing, alignment dislocation of substrates occurs according to shrinkage of the bag. However, when only atmosphere pressure is used as the compressing means, uniform pressure is applied on the entire substrate to prevent alignment dislocation of substrates.

As spacer materials, any material that can determine the gap between substrates can be used. Examples include glass fibers, resin beads, and glass beads. The spacer materials can be contained only in the seal material or only in the effective display portion, but it is preferable to use a certain spacer material respectively in the seal material and in the effective display portion to provide a uniform gap between substrates.

Any resin having an ultraviolet ray curing component and a thermosetting component can be used as a resin for the seal material in the present invention. However, a ultraviolet ray curing component cured by the radical polymerization is preferable since it has little interaction with the liquid crystal. A resin of the seal material is preferably a polyfunctional acrylate type resin including bisphenol A type vinyl ester type acrylate oligomer produced by SHOWA HIGH-POLYMER CO., LTD. such as "SP-1563" and "SP-1519" and a polyfunctional methacrylate type resin.

As components of the liquid seal material of the present inveniton, ultraviolet ray or heat polymerization initiators, sensitizing agents, reactive diluting agents and polymerization accelerators can be added as needed.

As thermosetting agents of the liquid crystal seal materials of the present invention, amine type thermosetting agents such as "EPIKURE Z" and "EPIKURE 150", imidazole type thermosetting agents such as "EPIKURE EMI-24", acid anhydride type thermosetting agents such as "EPIKURE YH-306" produced by YUKA SHELL EPOXY CO., LTD. and hydrazide type thermosetting agents such as "VDH", "UDH", and "LDH" produced by AJINOMOTO CO., LTD. are preferable since they do not have interaction with the liquid crystal and with respect to heating temperature and pot life.

Embodiments of production processes of liquid crystal display apparatus of the present invention will be explained with reference to the drawings.

Figure 1:
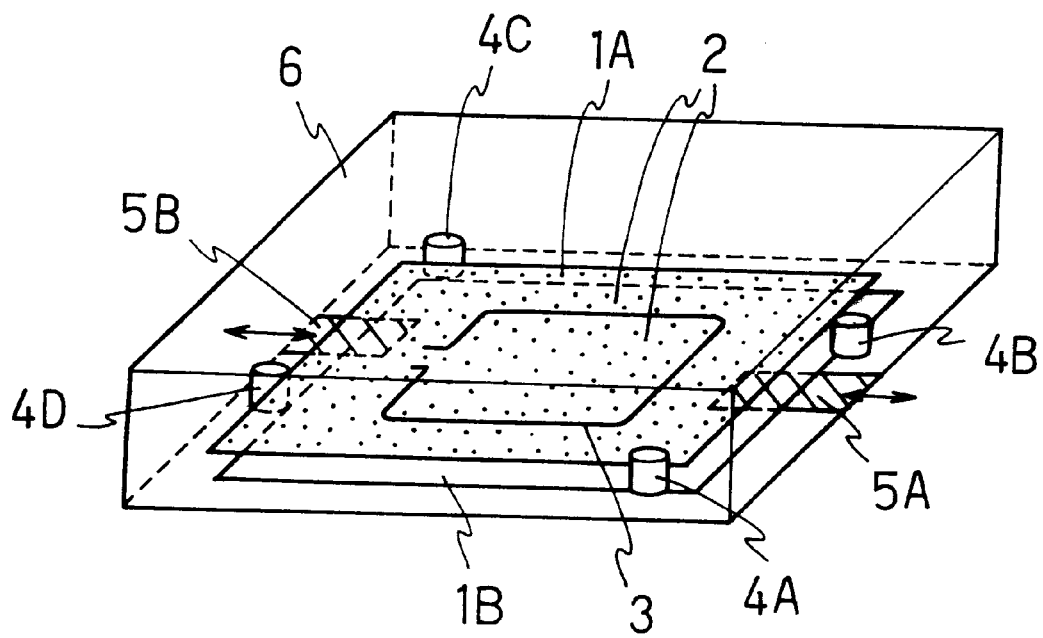
FIG. 1 is a perspective view illustrating the attaching process of two substrates with electrodes applied with alignment treatment of one embodiment of the present invention.

FIG. 1 is a perspective view illustrating the process of attaching substrates in the vacuum chamber. One substrate 1A of the two substrates to which electrodes were applied with an alignment treatment, on which glass beads spacer material 2 to control the cell gap were splinkled, and the other substrate 1B, on which a seal material 3 containing glass fiber, an ultraviolet ray curing component and a thermosetting component was formed by screen printing, were aligned, fixed with fixing pins 4A to 4D, and supported by movable spacer boards 5A and 5B so as not to contact to each other until an optional vaccum condition was obtained.

With the conditions, the pressure in the vacuum chamber 6 was reduced to become 1.0 to 0.4 Torr. Then the spacers 5A and 5B were removed to attach the substrates 1A and 1B.

Afterwards the vacuum chamber 6 was opened to compress the attached substrates by the atmospheric pressure to produce a cell 7. Since the atmospheric pressure was applied uniformly onto the entire substrate without biased stress, a good cell having a uniform cell gap without alignment dislocation was obtained.

Figure 2:
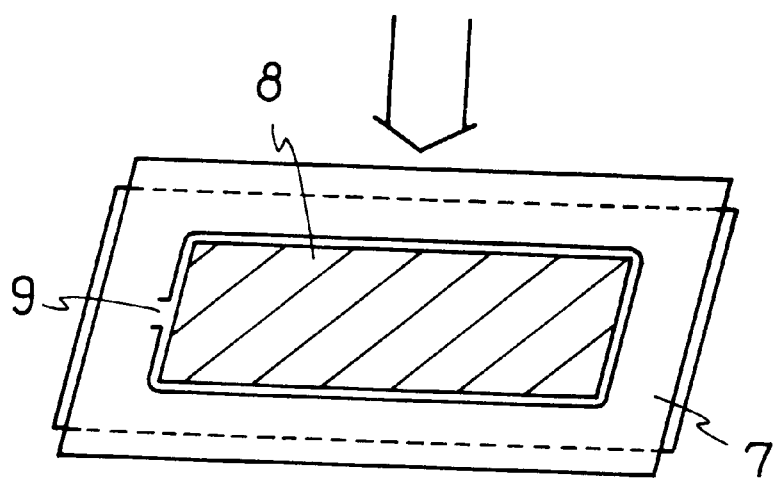
FIG. 2 is a diagram illustrating the temporary hardening process of the liquid crystal seal material by ultraviolet ray irradiation of one embodiment of the present invention.
Figure 3:
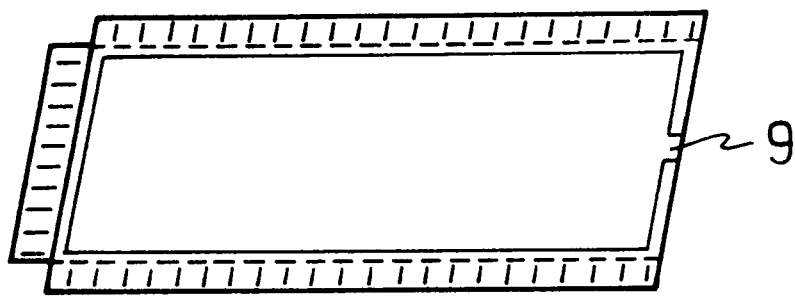
FIG. 3 is a perspective view illustrating the liquid crystal display panel produced by the production process of one embodiment of the present invention.

Then the display portion of the produced cell was covered with an ultraviolet ray mask 8 to irradiate an ultraviolet ray only to the seal portion to conduct a temporary hardening of the seal material 3 as illustrated in FIG. 2. Further, to improve the adherence of the seal material, main hardening was conducted.

Figure 4:
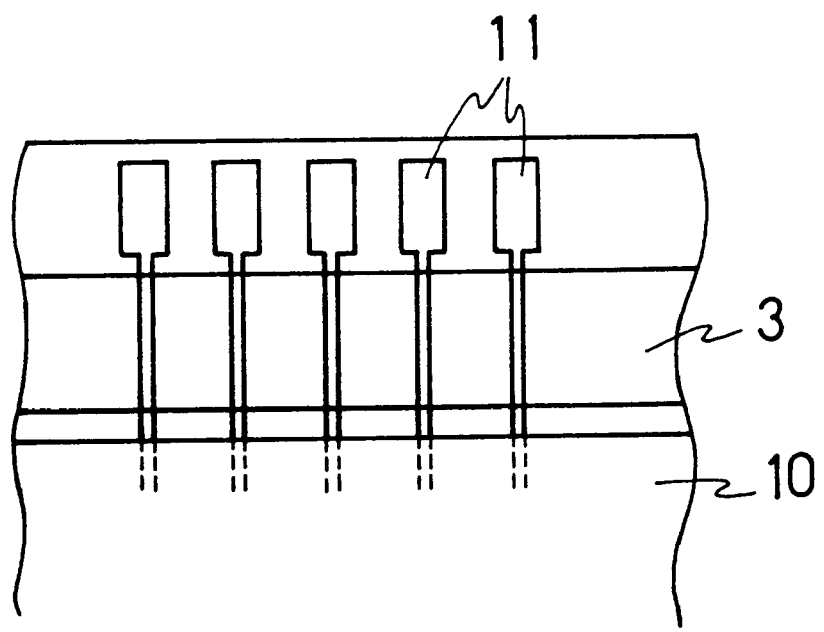
FIG. 4 is a partial enlarged view of the seal portion of the liquid crystal display panel of FIG. 3.

By using a seal material using both ultraviolet ray curing and thermosetting curing to allow a temporary hardening of the seal material by ultraviolet ray irradiation after producing a cell, a good straight finishing without discharge or cutoff of the seal material can be obtained as illustrated in FIG. 4. Further, by thermosetting, a seal material having good adherence and moisture resistance was obtained.

The cell 7 after main hardening was cut to leave electrode terminal portions and the liquid crystal was filled from an opening 9. By closing the opening, a liquid crystal display panel was completed.

The alignment on the edge of the seal portion of the liquid crystal display panel produced in the above mentioned process was good since the viscosity of the seal material was increased by improving the polymerization degree by conducting a temporary hardening of the seal material by the ultraviolet ray to eliminate the discharge of the seal material into the alignment film.

The production process of the liquid crystal display panels of this Example is a process of attaching two transparent substrates with electrodes with a liquid crystal seal material to provide a predetermined gap between the two substrates and then filling a liquid crystal into the gap.

The liquid crystal seal material for the liquid crystal display panel produced in the above mentioned method is a type including both an ultraviolet ray curing type component and a thermosetting type component. As a resin of the type including both ultraviolet ray curing type component and a thermosetting type component, acrylate resins and methacrylate resins which proceed with curing by the radical polymerization can be preferably used. Since a cationic optical initiator is used as the ultraviolet ray curing agent when an epoxy resin is used, a high ultraviolet ray energy is needed and the polymerization speed of an epoxy resin is slow. When a cationic initiator discharges into liquid crystal, the display quality deteriorates by the increase of the electric current value and poor alignment.

Examples of the acrylate resins and methacrylate resins include "SP-1519" and "SP-1563" produced by SHOWA HIGHPOLYMER CO., LTD. As optical initiators, acetophenone type optical initiators, benzoin type optical initiators and benzophenone type optical initiators can be used. Examples of the optical initiators include "IRGACURE 651" and "IRGACURE 907" produced by CIBA GEIGY JAPAN LTD. As thermosetting agents, aromatic amine type thermosetting agents, imidazole type thermosetting agents, acid anhydride thermosetting agents, hydrazide type thermosetting agents and organic peroxide type thermosetting agents can be used. Examples of aromatic amine type thermosetting agents include "EPIKURE Z" and "EPIKURE 150" produced by YUKA SHELL EPOXY CO., LTD. Examples of imidazole type thermosetting agents include "EPIKURE EMI-24" produced by YUKA SHELL EPOXY CO., LTD. Examples of acid anhydride type thermosetting agents include "EPIKURE YH-306" produced by YUKA SHELL EPOXY CO., LTD. Examples of hydrazide type thermosetting agents include "UDH", "LDH" and "VDH" produced by AJINOMOTO CO., LTD. Examples of organic peroxide type thermosetting agents include "PERBUTYL O", "PERBUTYL 355", "PERBUTYL L", "PERBUTYL Z" and "PERBUTYL IF" produced by NOF Corporation.

EXAMPLE 2

A production process of liquid crystal display panels of Example 2 of the present invention will be explained with reference to Tables and drawings.

Figure 5:
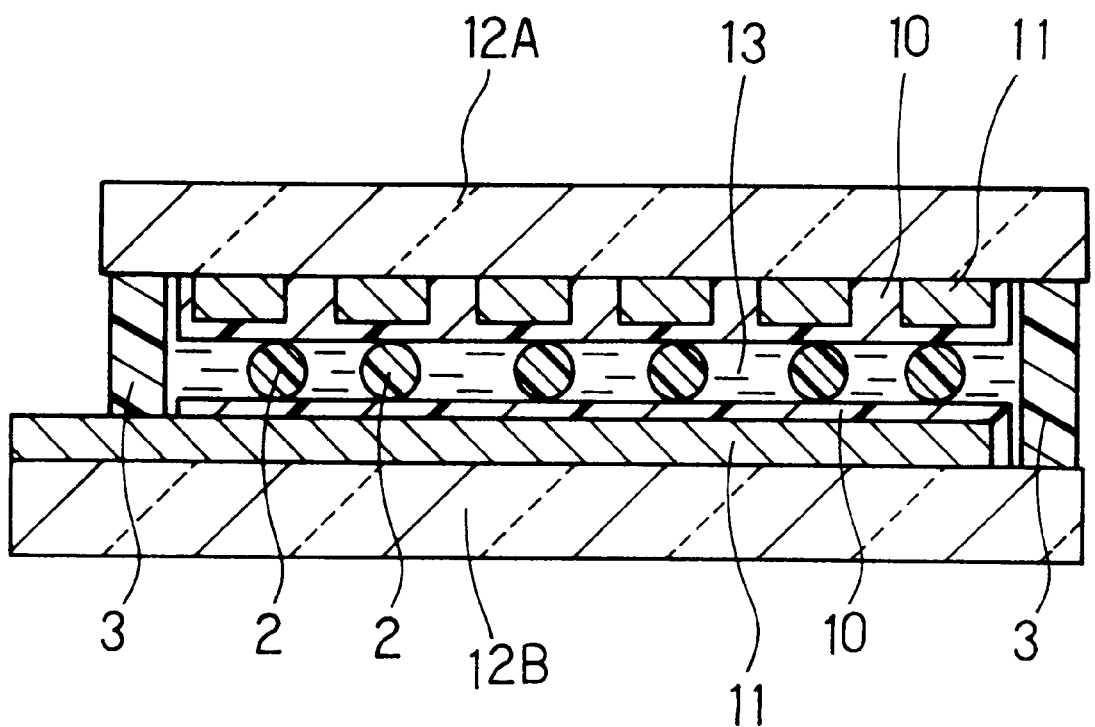
FIG. 5 is a sectional diagram of a liquid crystal display panel for a liquid crystal display apparatus of one embodiment of the present invention.

FIG. 5 is a sectional view illustrating a liquid crystal display panel produced in a production process of the present invention. The liquid crystal display panel of this Example has a structure formed by controlling a cell gap by sprinkling glass beads spacer material 2 between two substrates to which electrodes have been applied with an alignment treatment 12A, 12B, then attaching the substrates 12A, 12B to each other with a seal material 3 and sealing a liquid crystal 13 with the seal material 3. Numeral 11 in FIG. 5 denotes transparent electrodes formed on the primary surface of the substrates 12A and 12B. Numeral 10 is an alignment film formed on the primary surface of the substrates 12A and 12B to cover the transparent electrodes 11. The alignment film 10 does not overlap the region in which the seal material 3 is formed. The seal material 3 is a seal material including both an ultraviolet ray curing type component and a thermosetting type component.

Liquid crystal display panels having the above mentioned structure with various curing conditions of the seal material 3 were produced and the relationship between the curing ratio of the resin and properties of the liquid crystal display panel was examined.

Table 1 and Table 2 illustrate components of the seal materials of both ultraviolet ray curing and thermosetting used in this Example. Table 3 illustrates the components of the ultraviolet ray curing type seal material. Table 4 illustrates the relationship between the curing ratio of the curing resin, epoxy acrylate "SP-1563" produced by SHOWA HIGHPOLYMER CO., LTD in the seal material and the curing condition (ultraviolet ray irradiation time). In Table 4, the seal material A is the one having the components illustrated in Table 1, the seal material B is the one having the components illustrated in Table 2, and the seal material C is the one having the components illustrated in Table 3.

TABLE 1

| Component | Ratio (weight %) |
| --- | --- |
| Epoxy acrylate "SP-1563" produced by SHOWA HIGHPOLYMER CO., LTD. | 60 |
| Pentaerythritol triacrylate | 15 |
| γ-glycidoxy propyl methoxy diethoxy silane | 2 |
| "IRGACURE 651" produced by CIBA GEIGY JAPAN LTD. | 3 |
| "EPIKURE Z" produced by YUKA SHELL EPOXY CO., LTD. | 5 |
| Silica type filler material | 15 |

TABLE 2

| Component | Ratio (weight %) |
|---|---|
| Epoxy acrylate "SP-1563" produced by SHOWA HIGHPOLYMER CO., LTD. | 60 |
| Pentaerythritol triacrylate | 15 |
| γ-glycidoxy propyl methoxy diethoxy silane | 2 |
| "IRGACURE 651" produced by CIBA GEIGY JAPAN LTD. | 3 |
| Hydrazide type thermosetting agent "UDH" produced by AJINOMOTO CO., LTD. | 5 |
| Silica type filler material | 15 |

TABLE 3

| Component | Ratio (weight %) |
|---|---|
| Epoxy acrylate "SP-1563" produced by SHOWA HIGHPOLYMER CO., LTD. | 65 |
| Pentaerythritol triacrylate | 15 |
| γ-glycidoxy propyl methoxy diethoxy silane | 2 |
| "IRGACURE 651" produced by CIBA GEIGY JAPAN LTD. | 3 |
| Silica type filler material | 15 |

TABLE 4

| Seal/time | 30 sec | 45 sec | 1 min | 3 min | 5 min |
|---|---|---|---|---|---|
| Seal material A | 40% | 45 | 50 | 60 | 60 |
| Seal material B | 55 | 60 | 60 | 65 | 65 |
| Seal material C | 55 | 60 | 60 | 65 | 65 |

Herein the curing ratio was determined by measuring the amount of change of the carbon-carbon double bond (C=C) by comparing before and after curing reaction by FT-IR. That is, the curing ratio is the ratio of the reacted C=C double bond portions based on the C=C double bond portions of the entire curing resin region.

Table 5 shows the display property (outside appearance), and Table 6 shows the electric current value at 1V, 100 Hz.

TABLE 5

| Seal/time | 30 sec | 45 sec | 1 min | 3 min | 5 min |
|---|---|---|---|---|---|
| Seal material A | x | x | x | ○ | ○ |
| Seal material B | ○ | ○ | ○ | ⊚ | ⊚ |
| Seal material C | ○ | ○ | ○ | ⊚ | ⊚ |

TABLE 6

| Seal/time | 30 sec | 45 sec | 1 min | 3 min | 5 min |
|---|---|---|---|---|---|
| Seal material A | 3.5 μA | 3.5 | 3.5 | 2.6 | 2.6 |
| Seal material B | 2.8 | 2.6 | 2.5 | 2.5 | 2.5 |
| Seal material C | 2.8 | 2.6 | 2.5 | 2.5 | 2.5 |

As the ultraviolet ray lamp used in the ultraviolet ray curing, a high pressure mercury lamp "HGQ-2000" produced by JAPAN STORAGE BATTERY CO., LTD. is used with the irradiation degree of 20 mw of the ultraviolet ray of 420 nm or less to be irradiated to the seal material.

From Tables 4 to 6, it was learned that with the curing ratio by the ultraviolet ray irradiation of 60% or more, a good display property of the liquid crystal display panel can be obtained certainly in all of the seal material A (Table 1), the seal material B (Table 2), and the seal material C (Table 3).

In particular, when the seal material A (Table 1) including both ultraviolet ray curing type component and thermosetting curing type component is used, since the contained thermosetting type agent ("EPIKURE Z" produced by YUKA SHELL EPOXY CO., LTD.) is liquid type aromatic group amine, the thermosetting agent tends to elute into the liquid crystal. Therefore, in order to have a display property of a satisfactory level, the curing ratio of the curing resin needs to be 60% or more to prevent the elution of the uncured component and the thermosetting agent of the curing resin into the liquid crystal.

When the seal material B (Table 2) including both ultraviolet ray curing type component and thermosetting curing type component is used, since the contained thermosetting agent ("UDH" produced by AJINOMOTO CO., LTD.) is particle type hydrazide type compound, the thermosetting agent does not tend to elute into the liquid crystal. In this case, similar to the case of the ultraviolet ray curing seal material C (Table 3) not containing a thermosetting agent, with the curing ratio of the curing resin of 50% or more, the elution of the uncured component and the thermosetting agent into the liquid crystal can be prevented to have a satisfactory display level.

Accordingly, it was learned that with the same irradiation level of the ultraviolet ray irradiation lamp, a particle type thermosetting agent is more advantageous than a liquid type thermosetting agent, since a particle type thermosetting agent can be cured with a shorter time of ultraviolet ray irradiation to improve the productivity.

Tables 7 to 9 show the relationship between the curing condition (heating condition) and the curing ratio of the above mentioned seal material A (Table 1), seal material B (Table 2) and seal material C (Table 3), further with a heat curing of the curing resins in various conditions after the above mentioned ultraviolet ray reaction was saturated. Similarly, the curing ratio was determined by measuring the amount of change of the carbon-carbon double bond (C=C) by FT-IR.

TABLE 7

| Temperature/time | 1 hour | 2 hours | 5 hours | 12 hours | 24 hours |
|---|---|---|---|---|---|
| 100° C. | 75% | 80 | 85 | 90 | 90 |
| 110° C. | 75 | 80 | 85 | 90 | 90 |
| 120° C. | 80 | 85 | 85 | 90 | 90 |
| 130° C. | 85 | 85 | 90 | 90 | 90 |

TABLE 8

| Temperature/time | 1 hour | 2 hours | 5 hours | 12 hours | 24 hours |
|---|---|---|---|---|---|
| 100° C. | 70% | 70 | 75 | 80 | 85 |
| 110° C. | 70 | 70 | 75 | 80 | 85 |
| 120° C. | 80 | 85 | 85 | 90 | 90 |
| 130° C. | 85 | 85 | 90 | 90 | 90 |

TABLE 9

| Temperature/time | 1 hour | 2 hours | 5 hours | 12 hours | 24 hours |
|---|---|---|---|---|---|
| 100° C. | 65% | 65 | 65 | 65 | 65 |
| 110° C. | 65 | 65 | 65 | 65 | 65 |

TABLE 9-continued

| Temperature/time | 1 hour | 2 hours | 5 hours | 12 hours | 24 hours |
|---|---|---|---|---|---|
| 120° C. | 65 | 65 | 65 | 65 | 65 |
| 130° C. | 65 | 65 | 65 | 65 | 65 |

Tables 10 to 12 shows adhesion properties after heat curing.

TABLE 10

| Temperature/time | 1 hour | 2 hours | 5 hours | 12 hours | 24 hours |
|---|---|---|---|---|---|
| 100° C. | 4.8kgf | 5.0 | 5.5 | 5.8 | 5.8 |
| 110° C. | 4.8 | 5.0 | 5.5 | 5.8 | 5.8 |
| 120° C. | 5.3 | 5.5 | 5.8 | 5.8 | 5.8 |
| 130° C. | 5.5 | 5.5 | 5.8 | 5.8 | 5.8 |

TABLE 11

| Temperature/time | 1 hour | 2 hours | 5 hours | 12 hours | 24 hours |
|---|---|---|---|---|---|
| 100° C. | 4.0kgf | 4.0 | 4.5 | 5.0 | 5.3 |
| 110° C. | 4.0 | 4.0 | 4.5 | 5.0 | 5.3 |
| 120° C. | 5.0 | 5.5 | 5.8 | 6.0 | 6.0 |
| 130° C. | 5.0 | 5.5 | 5.8 | 6.0 | 6.0 |

TABLE 12

| Temperature/time | 1 hour | 2 hours | 5 hours | 12 hours | 24 hours |
|---|---|---|---|---|---|
| 100° C. | 3.5kgf | 3.5 | 3.5 | 4.0 | 4.0 |
| 110° C. | 3.5 | 3.5 | 3.5 | 4.0 | 4.0 |
| 120° C. | 3.8 | 3.8 | 3.8 | 4.0 | 4.0 |
| 130° C. | 3.8 | 3.8 | 3.8 | 4.0 | 4.0 |

Figure 6:
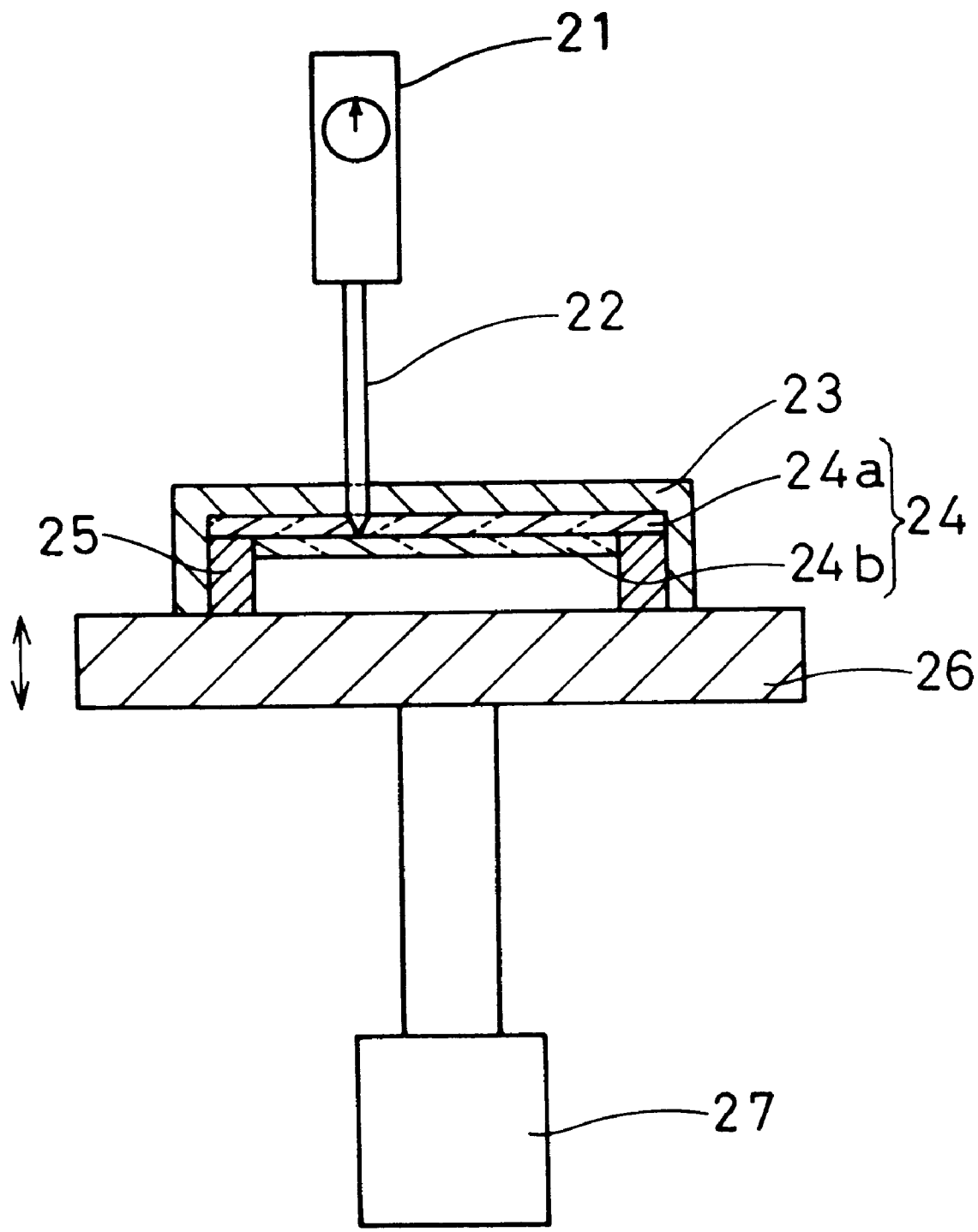
FIG. 6 is a plane view illustrating the peel strength test of a substrate of the liquid crystal display panel of one embodiment of the present invention.
Figure 7:
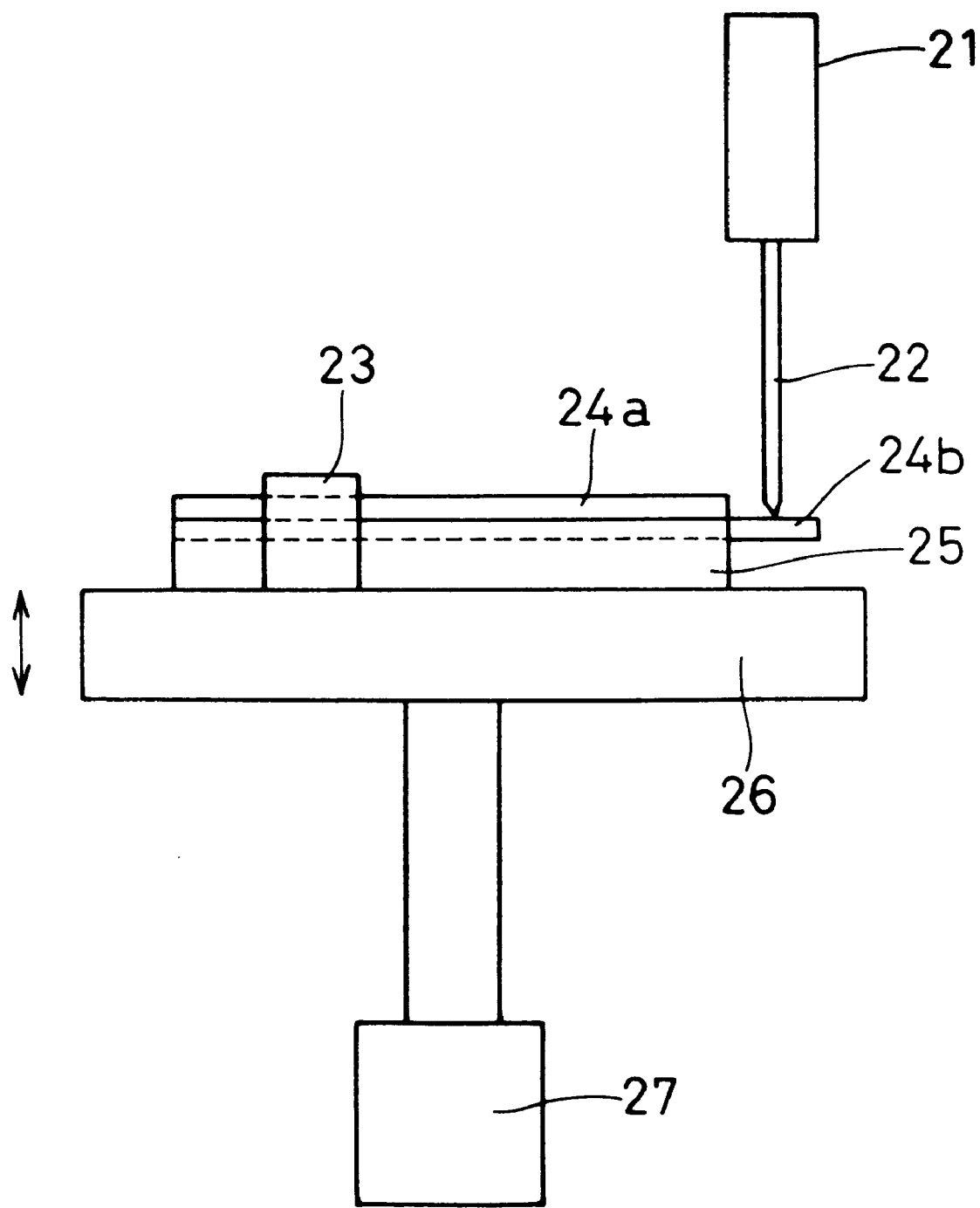
FIG. 7 is a side view illustrating the peel strength test of a substrate of the liquid crystal display panel of one embodiment of the present invention.

These adhesion properties were measured by the testing method illustrated in FIGS. 6 and 7. FIG. 6 is a plane view illustrating the testing apparatus conducting the peel strength test. FIG. 7 is a side view of the tesing apparatus. In FIGS. 6 and 7, numeral 21 denotes a pressure gauge, a pressing stick 22, a liquid crystal display panel holder 23, a liquid crystal display panel 24 for measuring that comprises an upper substrate 24A and a lower substrate 24B, a liquid crystal display panel support 25, a base 26, and a pulse motor 27. The sealing width of the liquid crystal display panel for measuring was 1 mm. The liquid crystal display panel for measuring 24 fixed on the base 26 was elevated by the upward movement of the base 26 by means of the pulse motor 27 with the lower substrate 24B pressed by the pressing stick 22. The compression power at the time when the lower substrate 24B separates from the upper substrate 24A was measured by the pressure gauge 21 and determined as the peeling strength.

From Tables 7 to 12, a seal material including both ultraviolet ray curing type component and thermosetting type component obtains the peeling strength of 5 kgf and more with the curing ratio of the curing resin of 80% or more so as to avoid the risk of the substrate peeling off in a following cutting process to divide a sheet into cells. On the other hand, an ultraviolet ray curing type seal material can not improve adhesion since it can not change the curing ratio after heating. Therefore, with only an ultraviolet ray curing type sealing material, a sufficient adhesion property of the substrate and the seal material can not be obtained.

From the above mentioned results, it was learned that by using a seal material including both an ultraviolet ray curing type component and a thermosetting type component, ultraviolet ray curing to provide a curing ratio of 60% or more of the ultraviolet ray curing resin in the seal material (with a particle type thermosetting agent, and the curing ratio is 50% or more), thermosetting to increase the curing ratio to 80% or more of the curing resin in the seal material, a liquid crystal display panel having a good display property and a high mechanical strength with the firm adhesion of the seal material and substrates can be obtained.

In particular, in the first curing stage of ultraviolet ray curing provides a fast curing speed to allow the substrates to be fixed without alignment dislocation. Therefore, generation of defect goods in production due to alignment dislocation can be prevented to improve the production efficiency.

EXAMPLE 3

Since the liquid crystal display panel used in the liquid crystal display apparatus of Example 3 has a radically polymerizable seal material including both an ultraviolet ray curing component and a thermosetting component, high reliability and display quality can be achieved. A sectional view of the liquid crystal display panel of this Example is shown in FIG. 5, and thus detailed explanation is omitted.

Components of the seal material will be explained concretely.

As epoxy (meth)acrylate, bisphenol A type epoxy (meth)acrylate or novolak type epoxy (meth)acrylate are preferable. Examples of bisphenol A type epoxy (meth)acrylate include bisphenol A type glycidyl ether modified diacrylate. Examples of novolak type epoxy (meth)acrylate include novolak type glycidyl ether modified diacrylate. In this Example, the bisphenol A type epoxy acrylate oligomer "SP-1563" produced by SHOWA HIGHPOLYMER CO., LTD. was used.

Examples of (meth)acrylic acid ester having a plurality of (meth)acrylic acid residue per molecule include pentaerythritol triacrylate and pentaerythritol tetraacrylate. In this Example, the pentaerythritol triacrylate "VISCOAT #300" produced by Osaka Organic Chemical Industry LTD. was used.

Examples of (meth)acrylic acid ester having one (meth) acrylic acid residue per molecule include tetra hydrofurfuryl acrylate, 2-hydroxy propyl acrylate and ethoxy diethylene glycol acrylate. In this Example, the ethoxy diethylene glycol acrylate "EC-A" produced by KYOEISHA Chemical Co., LTD. was used.

As optical initiators, acetophenone type optical initiators, benzoin type optical initiators and benzophenone type optical initiators are preferable. Examples of acetophenone type optical initiators include diethoxy acetophenone, 4-t-butyl-dicycloacetophenone and 2,2-dimethoxy-2-phenyl acetone. Examples of benzoin type optical initiators include benzoin, benzoin ethyl ether and benzyl methyl ketal. Examples of benzophenone type optical initiators include benzophenone, 4-phenyl benzophenone and hydroxy benzophenone. In this Example, 2,2-dimethoxy-2-phenyl acetone "IRGACURE 651" produced by CIBA GEIGY JAPAN LTD. was used.

As thermosetting agents, hydrazide type thermosetting agents, aromatic amine type thermosetting agents, acid anhydride thermosetting agents and imidazole type thermosetting agents are preferable. Examples of hydrazide type thermosetting agents include 7,11-octadecadiene hydrazide and adipic acid dihydrazide. Examples of aromatic amine type thermosetting agents include diamino diphenyl methane and methphenylene diamine. Examples of acid anhydride type thermosetting agents include hexahydro phthalic anhydride and tetrahydro phthalic anhydride. Examples of imidazole type thermosetting agents include 2-ethyl methyl imidazole, 2-methyl imidazole and 1-benzyl-2-methyl imidazole. In this Example, the hydrazide type thermosetting agent "UDH" produced by AJINOMOTO CO., LTD., which was adjusted to have the average particle size of 3 μm with three rolls in kneading the seal material, or the scale-like modified aromatic amine "EPIKURE Z" produced by YUKA SHELL EPOXY CO., LTD., was used.

As silane coupling agents, glycidyl ethoxy silane and glycidyl methoxy silane are preferable. In this Example, the γ-glycidoxy propyl trimethoxy silane "KBM 403" produced by SHIN-ETSU Chemical Co., LTD. was used.

As inorganic fillers, hydrated magnesium silicate, calcium carbonate, aluminum oxide and silica are preferable. In this Example, the hydrated magnesium silicate "SUPER TALC SG-95" having the average particle size of 1.4 μm produced by Nippon TALC CO., LTD. and silicon dioxide "AEROSIL R202" having the average particle size of 15 nm produced by Nippon AEROSIL Co., LTD. were used.

In ultraviolet ray curing, generally a high pressure mercury lamp is used and irradiation conditions vary depending upon the kind of the lamp, composition and amount of the seal material and the distance from the lamp. Therefore curing conditions may be adjusted according to the irradiation conditions. Although the conditions are not particularly limited, for example, as to energy amount, an irradiation condition of about 500 mJ to 600 mJ is adopted. In this Example, a high pressure mercury lamp "HGQ-2000" produced by JAPAN STORAGE BATTERY CO., LTD. was used and an ultraviolet ray irradiation of a wavelength of 420 nm or less with the irradiation degree of 20 mw/cm² for 2 minutes was applied to the seal material to have the irradiation energy of 4800 mJ. As to thermosetting, conditions vary depending upon the kind of the thermosetting agent, and the kind and amount of the other materials. Although the conditions are not particularly limited, a condition of 100° C. to 150° C. for 1 hour or more is adopted. In this Example, it was conducted at 120° C. for 12 hours which is equivalent to the annealing condition of the liquid crystal panel.

EXAMPLE 4

FIG. 5 illustrates a sectional view of the liquid crystal display panel used for evaluation. Since the structure and parts have been explained already, they are not described further.

Table 13 shows components, ratio, initial adherence and adherence after 8 hours of pressure cooker test (hereinafter abbreviated as PCT) at 120° C., 120% (relative humidity), 2 atm, display property and electric current value change of the liquid crystal display panel after 1000 hours of a high temperature test at 120° C. and display property and electric current change after a moisture resistance test for 1000 hours at 60° C. and 95% (relative humidity).

TABLE 13

|  | Example | | | Comparative Example | | |
| --- | --- | --- | --- | --- | --- | --- |
|  | A | B | C | A | B | C |
| "SP-1563" | 65 | 60 | 65 | 50 | 70 | 65 |
| "VISCOAT #300" | 5 | 10 | 5 | 5 | 5 | 7 |
| "EC-A" | 5 | 5 | 5 | 20 |  | 7 |

TABLE 13-continued

|  | Example | | | Comparative Example | | |
| --- | --- | --- | --- | --- | --- | --- |
|  | A | B | C | A | B | C |
| "KBM 403" | 3 | 3 | 3 | 3 | 3 | 3 |
| "IRGACURE 651" | 5 | 5 | 5 | 5 | 5 | 5 |
| "EPIKURE Z" | 4 | 4 |  | 4 | 4 |  |
| "UDH" |  |  | 4 |  |  |  |
| "SUPER TALC SG-95" | 10 | 10 | 10 | 10 | 10 | 10 |
| "AEROSIL R202" | 3 | 3 | 3 | 3 | 3 | 3 |
| Adherence |  |  |  |  |  |  |
| Initial | ◎ | ◎ | ◎ | ◎ | X | Δ |
| PCT 8 hours | ◎ | ◎ | ◎ | ◎ | X | X |
| Electric current value |  |  |  |  |  |  |
| 120° C. for 1000 hours | ◎ | ◎ | ◎ | Δ | ◎ | ○ |
| 60° C., 95% for 1000 hours | ◎ | ◎ | ◎ | X | ◎ | X |
| Appearance evaluation |  |  |  |  |  |  |
| 120° C. for 1000 hours | ◎ | ◎ | ◎ | X | ◎ | ◎ |
| 60° C., 95 % for 1000 hours | ◎ | ◎ | ◎ | X | ◎ | ◎ |

◎ Good.  ○ No problem for use, Δ inadequate for future use, X unusable

The evaluation criteria were based on the usability in an environment in which OA equipment such as ordinary personal computers and word processors are used. The mark "Δ inadequate for future use" means that it may not be suitable for a more severe environment in which application may be developed in the near future, such as an application in an automobile or an outdoor application.

Examples A and B have 5% and 10% of (meth)acrylic acid ester having a plurality of (meth)acrylic acid residues ("VISCOAT #300") respectively. Examples A and C have the modified aromatic type amine "EPIKURE Z" and the hydrazide type "UDH" respectively as the thermosetting agent. The other components and ratio thereof are the same. Comparative Example A include the (meth)acrylic acid ester having one (meth)acrylic acid residue per molecule "EC-A" in an excessive amount of 20 weight %. Comparative Example B excludes "EC-A". Comparative Example C excludes a thermosetting agent.

Comparative Example A has a deteriorated alignment of the liquid crystal after exposure to a high temperature. Besides, the electric current value was increased in both the moisture resistance test and the high temperature test to deteriorate the display quality of the liquid crystal display apparatus.

Comparative Examples B and C do not have problems in terms of properties of the liquid crystal display panel after the high temperature test or the moisture resistance test. However, Comparative Example B has an inferior initial adherence and Comparative Example C has an inferior adherence after PCT.

From the results mentioned above, it was learned that Examples A, B, C are good seal materials which can provide a reliable liquid crystal display apparatus with a good display quality without problems in terms of adherence, high temperature or high humidity.

EXAMPLE 5

One embodiment of a liquid crystal display apparatus of the present invention formed by a dropping method, namely, by forming a seal material on one of two substrates with electrodes applied with alignment treatment, attaching the substrates via a spacer means and dropping a liquid crystal therebetween will be explained.

Figure 8:
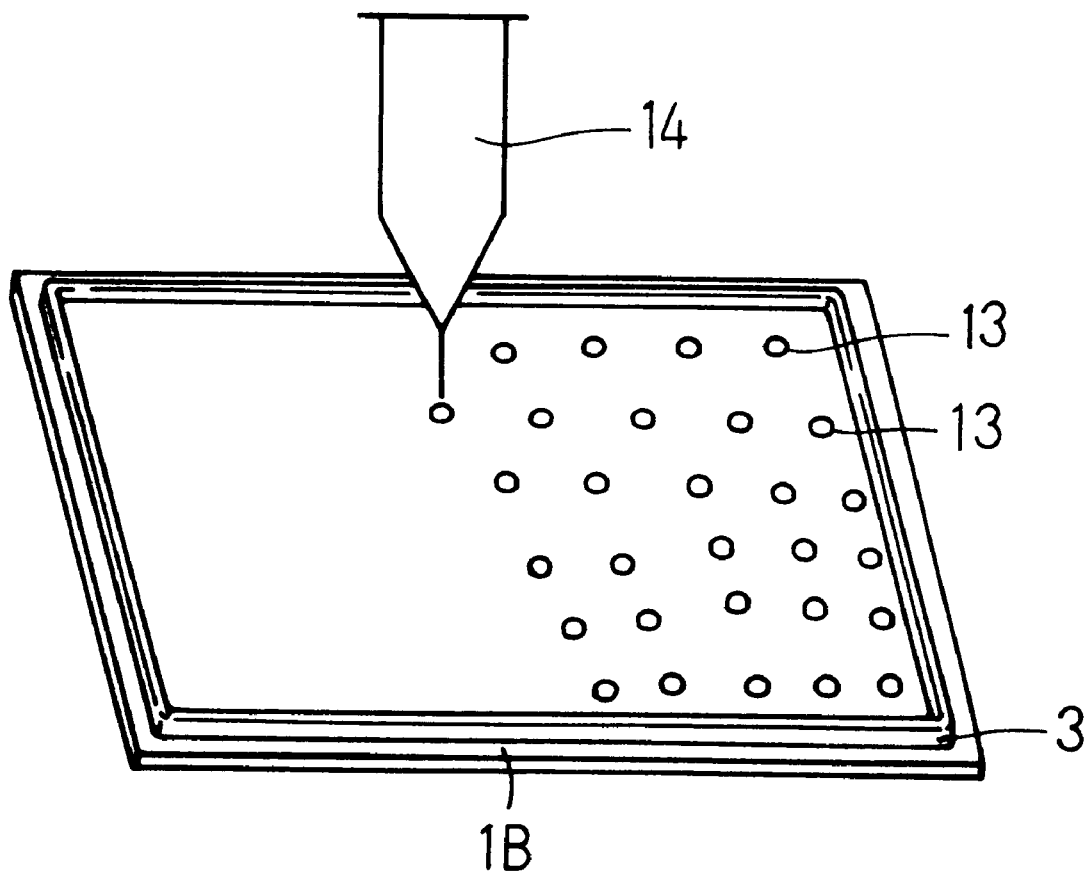
FIG. 8 is a perspective view illustrating the process of dropping liquid crystal in a dropping process of a production process of a liquid crystal display panel of one embodiment of the present invention.
Figure 9:
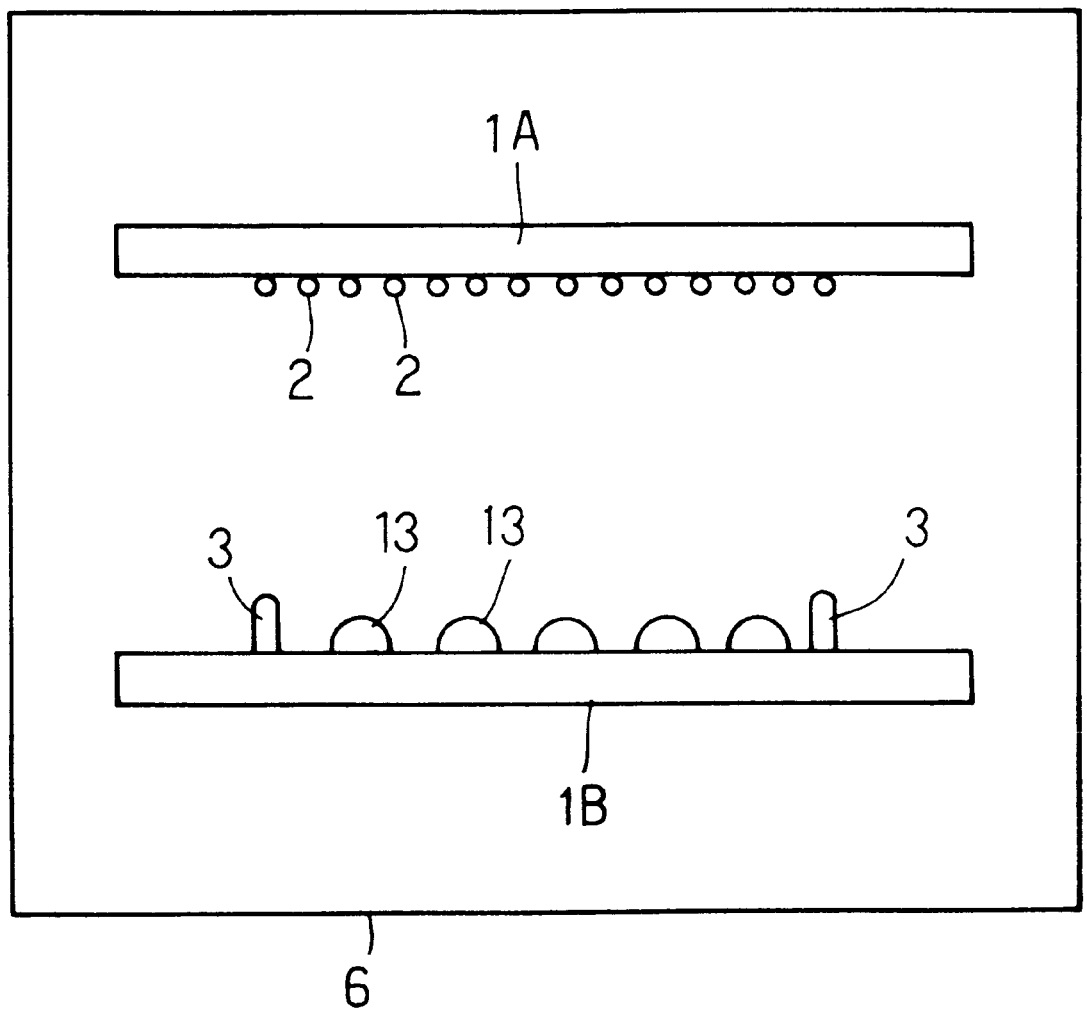
FIG. 9 is a sectional view illustrating the process of attaching a substrate to which liquid crystal was dropped to an opposing substrate with a spacer material located thereon.

The dropping method will be described with reference to FIGS. 8 and 9. FIG. 8 is a perspective view to show the process of dropping the liquid crystal in the production process of a liquid crystal panel for a liquid crystal display apparatus. FIG. 9 is a sectional view to show the process of attaching a substrate to which the liquid crystal was dropped and the other opposing substrate via a spacer material in the production process of a liquid crystal display panel for a liquid crystal display apparatus.

In FIG. 8, a seal material 3 was formed in an optional pattern on the inner side of the substrate with electrodes applied with alignment treatment 12B by screen printing. To the region surrounded by the seal material, a liquid crystal 13 was dropped with a liquid dispenser 14.

In FIG. 9, glass beads spacer material 2 was uniformly sprinkled and fixed to the inner side of the substrate having electrodes applied with an alignment treatment 12A opposing the above mentioned substrate on which the liquid crystal was placed 12B. Then the substrates 12A and 12B were attached to each other in a reduced pressure of 0.4 to 1.0 Torr in the vacuum chamber 6. By further applying compression to the substrate by atmospheric pressure, the gap was controlled.

Table 14 shows components, ratio, alignment condition of the liquid crystal on the edge of the seal portion, electric current value change and appearance evaluation after 1000 hours of a high temperature test at 120° C., electric current value change and appearance evaluation after a moisture resistance test for 1000 hours at 60° C. and 95% (relative humidity).

TABLE 14

|  | Example | | | Comparative Example | | |
| --- | --- | --- | --- | --- | --- | --- |
|  | D | E | F | D | E | F |
| "SP-1563" | 68 | 60 | 68 | 62 | 58 | 55 |
| "VISCOAT #300" | 5 | 5 | 5 | 8 | 15 | 5 |
| "EC-A" | 2 | 10 | 2 | 9 | 2 | 9 |
| "EPICOAT 802" |  |  |  |  |  | 10 |
| "KBM 403" | 3 | 3 | 3 | 3 | 3 | 3 |
| "IRGACURE 651" | 5 | 5 | 5 | 5 | 5 | 5 |
| "EPIKURE Z" | 4 | 4 |  |  | 4 |  |
| "UDH" |  |  | 4 |  |  |  |
| "SUPER TALC SG-95" | 10 | 10 | 10 | 10 | 10 | 10 |
| "AEROSIL R202" | 3 | 3 | 3 | 3 | 3 | 3 |
| Alignment condition on the verge of the seal | ◎ | ◎ | ◎ | ○ | X | X |
| Electric current value |  |  |  |  |  |  |
| 120° C. for 1000 hours | ◎ | ◎ | ◎ | ○ | ◎ | ○ |
| 60° C., 95% for 1000 hours | ◎ | ◎ | ◎ | X | ◎ | X |
| Appearance evaluation |  |  |  |  |  |  |
| 120° C. for 1000 hours | ◎ | ◎ | ◎ | ○ | ○ | ○ |
| 60° C., 95% for 1000 hours | ◎ | ◎ | ◎ | X | ◎ | X |

◎ Good, ○ No problem for use, Δ inadequate for future use, X unusable

Examples D and E have 2 weight % and 10 weight % of the (meth)acrylic acid ester having one (meth)acrylic acid residue per molecule "EC-A" respectively. Examples D and F have the modified aromatic type amine "EPIKURE Z" and the hydrazide type "UDH" respectively as the thermosetting agent. The other components and ratio thereof are the same. Comparative Example D excludes the thermosetting agent "EPIKURE Z". Comparative Example E includes the (meth) acrylic acid ester having a plurality of (meth)acrylic acid residues per molecule ("VISCOAT #300") in an excessive amount of 15 weight %. Comparative Example F includes "Epicoat 802" produced by YUKA SHELL EPOXY CO., LTD. as the epoxy resin and a thermosetting agent for the epoxy equivalent amount.

From the results mentioned above, it was learned that in Comparative Examples E and F, uncured components tend to elute into the liquid crystal and the poorly aligned region of the liquid crystal was large on the edge of the seal to erode the display area.

Further, in Comparative Examples D and F, the electric current value was increased after the moisture resistance test to show the unreliability. The reasons include elution of the uncured component by the water content or a high temperature liquid crystal due to the fact that a great deal of components irrelevant to polymerization at the ultraviolet ray curing such as epoxy resin are included, and deterioration of moisture resistance by the absense of a thermosetting agent, resulting in reduced crosslinking density and the increasing adsorption of moisture to reduce the moisture resistance.

On the other hand, Examples D, E, F showed good alignment condition on the edge of the seal portion as well and reliability even at a high temperature and moisture. Accordingly, by using a seal material of the present invention, a liquid cyrstal display apparatus with a good display quality and reliability can be obtained even in a production with a dropping method.

As this invention can be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds are therefore intended to embraced by the claims.

What is claimed is:

1. A liquid crystal display panel comprising two transparent substrates with electrodes attached therebetween, the substrates sealed to each other with a seal material free of reactive epoxy groups, wherein said seal material undergoes a first process of irradiating an ultraviolet ray to the seal material, and a second process for increasing the curing by heating the seal material after the first process, and wherein the curing resin of the seal material is cured to have a curing ratio of 50% or more after said first process and a curing ratio of 80% or more after said second process, wherein the seal material is formed from (meth)acrylate monomers or oligomers derived from an epoxy compound, (meth)acrylic acid ester, a photoinitiator, a thermosetting agent and an inorganic filler, wherein the (meth)acrylic acid ester includes 5 to 10 weight % based on the seal material of (meth)acrylic acid ester having a plurality of (meth)acrylic acid residues per molecule and 2 to 10 weight % based on the seal material of (meth)acrylic acid ester having one (meth)acrylic acid residue per molecule, the seal material being capable of ultraviolet ray curing and thermosetting, wherein the seal material undergoes radical polymerization.

2. The liquid crystal display panel according to claim 1, wherein the php+p initiator is selected from the group consisting of acetophenone, benzoin, and benzophenone initiators.

* * * * *